(12) United States Patent
Ye et al.

(10) Patent No.: US 8,571,104 B2
(45) Date of Patent: Oct. 29, 2013

(54) ADAPTIVE COEFFICIENT SCANNING IN VIDEO CODING

(75) Inventors: Yan Ye, San Diego, CA (US); Marta Karczewicz, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1099 days.

(21) Appl. No.: 12/133,232

(22) Filed: Jun. 4, 2008

(65) Prior Publication Data

US 2008/0310745 A1 Dec. 18, 2008

Related U.S. Application Data

(60) Provisional application No. 61/030,443, filed on Feb. 21, 2008, provisional application No. 60/944,470, filed on Jun. 15, 2007, provisional application No. 60/979,762, filed on Oct. 12, 2007.

(51) Int. Cl.
*H04N 7/12* (2006.01)

(52) U.S. Cl.
USPC .................................... 375/240.14

(58) Field of Classification Search
None
See application file for complete search history.

(56) References Cited

U.S. PATENT DOCUMENTS

| | | | |
|---|---|---|---|
| 4,894,713 A | 1/1990 | Delogne et al. | |
| 5,136,371 A | 8/1992 | Savatier et al. | |
| 5,629,779 A | 5/1997 | Jeon | |
| 5,684,536 A | 11/1997 | Sugiyama et al. | |
| 5,721,822 A | 2/1998 | Agarwal | |
| 5,767,909 A | 6/1998 | Jung | |
| 5,995,055 A | 11/1999 | Milroy | |
| 6,115,071 A | 9/2000 | Hurst, Jr. et al. | |
| 6,157,676 A | 12/2000 | Takaoka et al. | |
| 6,345,121 B1 | 2/2002 | Matsumoto | |
| 6,674,910 B1 | 1/2004 | Moon et al. | |

(Continued)

FOREIGN PATENT DOCUMENTS

| | | |
|---|---|---|
| CN | 1289213 A | 3/2001 |
| CN | 1798341 A | 7/2006 |

(Continued)

OTHER PUBLICATIONS

Translation of Russian Office Action dated Dec. 13, 2010, Russian Application 2010101116, citing V.I. Pershikov, V.M. Savinkov, "Tolkovy Slovar po Informatike" (The Explanatory Dictionary of Informatics), Moscow, Finances and Statistics Publishing House, 1995, p. 425.

(Continued)

*Primary Examiner* — Gregory Sefcheck
(74) *Attorney, Agent, or Firm* — Todd E. Marlette

(57) ABSTRACT

This disclosure describes techniques for scanning coefficients of video blocks, e.g., quantized and transformed coefficients. Rather than use conventional zig-zag scanning, the techniques of this disclosure adapt the scanning order based on statistics associated with previously coded blocks that were coded in the same prediction mode. For each prediction mode, statistics of the coefficients are stored, e.g., indicating probabilities that given coefficients are zero or non-zero. Periodically, adjustments to the scanning order can be made in order to better ensure that non-zero coefficients are grouped together and zero value coefficients are grouped together, which can improve the effectiveness of entropy coding. The techniques of this disclosure provide thresholds and threshold adjustments that can reduce the frequency that the scanning order adjustments occur, yet still achieve desired improvements in compression due to such scanning order adjustments.

50 Claims, 8 Drawing Sheets

(56) References Cited

U.S. PATENT DOCUMENTS

| | | | |
|---|---|---|---|
| 6,724,818 B1* | 4/2004 | Frojdh et al. | 375/240.07 |
| 7,170,937 B2 | 1/2007 | Zhou | |
| 7,215,707 B2 | 5/2007 | Lee et al. | |
| 7,263,232 B2 | 8/2007 | Srinivasan | |
| 7,379,501 B2* | 5/2008 | Lainema | 375/240.29 |
| 7,529,484 B2 | 5/2009 | Xu et al. | |
| 7,706,443 B2* | 4/2010 | Chandramouly et al. | 375/240.12 |
| 7,751,476 B2* | 7/2010 | Tanizawa et al. | 375/240.03 |
| 7,933,337 B2 | 4/2011 | Srinivasan et al. | |
| 7,970,058 B2 | 6/2011 | Suzuki | |
| 2002/0055215 A1 | 5/2002 | Tamura et al. | |
| 2003/0128753 A1* | 7/2003 | Lee et al. | 375/240.2 |
| 2003/0146936 A1 | 8/2003 | Greer et al. | |
| 2004/0120590 A1 | 6/2004 | Fuchs et al. | |
| 2004/0151395 A1 | 8/2004 | Kesaniemi et al. | |
| 2004/0213348 A1 | 10/2004 | Kim et al. | |
| 2005/0025236 A1 | 2/2005 | Yan et al. | |
| 2005/0036549 A1 | 2/2005 | He et al. | |
| 2005/0078754 A1 | 4/2005 | Liang et al. | |
| 2005/0157797 A1 | 7/2005 | Gaedke | |
| 2005/0243920 A1 | 11/2005 | Murakami et al. | |
| 2005/0281334 A1 | 12/2005 | Walker et al. | |
| 2005/0281337 A1 | 12/2005 | Kobayashi et al. | |
| 2006/0146936 A1 | 7/2006 | Srinivasan | |
| 2007/0005795 A1 | 1/2007 | Gonzalez | |
| 2007/0014348 A1* | 1/2007 | Bao et al. | 375/240.1 |
| 2007/0160303 A1* | 7/2007 | Guleryuz et al. | 382/240 |
| 2008/0008246 A1 | 1/2008 | Mukherjee et al. | |
| 2008/0075171 A1 | 3/2008 | Suzuki | |
| 2008/0310504 A1 | 12/2008 | Ye et al. | |
| 2008/0310507 A1 | 12/2008 | Ye et al. | |
| 2008/0310512 A1 | 12/2008 | Ye et al. | |
| 2012/0027079 A1* | 2/2012 | Ye et al. | 375/240.02 |
| 2012/0099646 A1* | 4/2012 | Coban et al. | 375/240.12 |
| 2013/0044812 A1 | 2/2013 | Ye et al. | |

FOREIGN PATENT DOCUMENTS

| | | | |
|---|---|---|---|
| CN | 1801940 A | | 7/2006 |
| EP | 1553782 A2 | | 7/2005 |
| EP | 1679903 | | 7/2006 |
| EP | 1768415 A1 | | 3/2007 |
| EP | 1876838 A2 | | 1/2008 |
| JP | 1155678 A | | 6/1989 |
| JP | 08280032 | | 10/1996 |
| JP | 10271505 A | | 10/1998 |
| JP | 2002135126 A | | 5/2002 |
| JP | 2002232887 A | | 8/2002 |
| JP | 2003250157 A | | 9/2003 |
| JP | 2004007766 A | | 1/2004 |
| JP | 2006191628 A | | 7/2006 |
| JP | 2007053561 A | | 3/2007 |
| KR | 20060079087 A | | 7/2006 |
| RU | 2119727 | | 9/1998 |
| RU | 2127962 C1 | | 3/1999 |
| RU | 2162280 C2 | | 1/2001 |
| RU | 2004139081 | | 7/2005 |
| RU | 2258320 C2 | | 8/2005 |
| RU | 2004125588 | | 1/2006 |
| RU | 2005113308 | | 1/2006 |
| RU | 2005137246 | | 6/2007 |
| RU | 2314656 | | 1/2008 |
| WO | WO9421083 A1 | | 9/1994 |
| WO | WO9800807 A1 | | 1/1998 |
| WO | WO03063501 A1 | | 7/2003 |
| WO | WO2004032032 A1 | | 4/2004 |
| WO | WO2007010690 A1 | | 1/2007 |
| WO | WO2007046644 | | 4/2007 |
| WO | WO2007063472 A2 | | 6/2007 |

OTHER PUBLICATIONS

Aase, et al., "A critique of SVD-based image coding systems" IEEE Circuits and Systems, vol. 4, May 30, 1999-Jun. 2, 1999, pp. 13-16, XP002503942.

Bing, et al., "Directional Discrete Cosine Transforms for image Coding" Multimedia and EXPO, 2006 IEEEInternational Conference on, IEEE, PI, Jul. 1, 2006, pp. 721-724, XP031032937.

Karczewicz, "lmoroved Intra Coding," Video Standards and Drafts, XX, XX No. VCEG-AF15, Apr. 19, 2007, XP030003536.

Richardson, "H264/MPEG-4 Part 10 White Paper—Prediction or Intra Macroblocks" XP002261494.

Xiaopeng, et al., "A novel coefficient scanning scheme for directional spatial prediction-based image compression", Multimedia and EXPO, 2003. Proceedings. 2003 International Conference on Jul. 6-9, 2003, Piscataway, NJ, vol. 2, pp. 557-560, XP010650616.

Ye, et al., "lmproved Intra Coding," ITU-T Q.6/SG16 VCEG, C257, Geneva, Switzerland, Jun. 2007.

International Search Report—PCT/US08/066796, International Searching Authority—European Patent Office, Nov. 27, 2008.

Written Opinion—PCT/US08/066796, International Searching Authority—European Patent Office, Nov. 27, 2008.

Sridhar Srinivasan, "An introduction to HD Photo," MPEG document No. wg1n4184, Apr. 2007.

T. Shiodera, A. Tanizawa, and T. Chujoh, "Simulation Results of Bidirectional Intra Prediction on KTA software version 1.3," ITU-T Q.6/SG16 VCEG, VCEG-AF06, San Jose, USA, Apr. 2007.

T. Shiodera, A. Tanizawa, and T. Chujoh, "Bidirectional Intra Prediction," ITU-T Q.6/SG16 VCEG, VCEG-AE14, Marrakech, Morocco, Jan. 2007.

Iain Richardson: Video Coding H.264 i MPEG-4—New Generation Standards, Moscow, Tekhnosfera, 2005, translation of 2003 publication, pp. 145-183, 233-240.

Jongho Kim et al., "Complexity Reduction Algorithm for Intra Mode Selection in H.264/AVC Video Coding", Advanced Concepts for Intelligent Vision Systems, Lecture Notes in Computer Science, Springer Berlin/Heidelberg, vol. 4179/2006, Oct. 4, 2006, pp. 454-465.

Ragip Kurceren, et al., "Improvements on CABAC," ITU—Telecommunications Standardization Sector Study Group 16 Question 6 Video Coding Experts Group (VCEG), VCEG-024, 15th Meeting: Pattaya, Thailand, Dec. 4-6, 2001.

Wiegand, "Text of Committee Draft of Joint Video Specification", Joint Video Team (JVT) of ISO/IEC MPEG and ITU-T VCEG, JVT-C167, 3rd Meeting: Fairfax, Virginia, USA, May 6-10, 2002.

Yan Ye and Marta Karczewicz, "Complexity Analysis of Improved Intra Coding", ITU—Telecommunications Standardization Sector Study Group 16 Question 6 Video Coding Experts Group (VCEG), 34th Meeting: Antalya Turkey, Jan. 2008, VCEG-AH20, pp. 1-6.

Taiwan Search Report—TW097122351—TIPO—Mar. 11, 2013.

* cited by examiner

MODE X

| S1 | S2 | S3 | S4 |
|----|----|----|----|
| S5 | S6 | S7 | S8 |
| S9 | S10 | S11 | S12 |
| S13 | S14 | S15 | S16 |

69

INITIAL SCAN ORDER
(S1, S2, S5, S9, S6, S3, S4, S7, S10, S13, S14, S11, S8, S12, S15, S16)

Count(mode X) = a count of the
number of blocks coded in Mode X

60

```
IF Count(mode X)>=THRESHOLD
    SELECT SCAN ORDER BASED ON STATISTICS
    IF SCAN ORDER CHANGES
        ADJUST THRESHOLD DOWNWARD
    END IF
    IF SCAN ORDER DOES NOT CHANGE
        ADJUST THRESHOLD UPWARD
    END IF
    RE-SET Count(mode X)
END IF
```

FIG. 6

ADAPTIVE COEFFICIENT SCANNING IN VIDEO CODING

This application claims the benefit of the following U.S. Provisional Applications:

U.S. Provisional Application No. 61/030,443, filed on Feb. 21, 2008, U.S. Provisional Application No. 60/944,470, filed on Jun. 15, 2007, and U.S. Provisional Application No. 60/979,762, filed on Oct. 12, 2007.

The entire content of each of these applications is incorporated herein by reference.

TECHNICAL FIELD

This disclosure relates to digital video coding and, more particularly, entropy coding of coefficients of video blocks, such as transform coefficients of transformed video blocks.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Video compression generally includes spatial prediction and/or temporal prediction. In particular, intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks of two or more adjacent coded units.

A coded video block may be represented by prediction information that comprises a prediction mode and a predictive block size, and a residual block of data indicative of differences between the block being coded and a predictive block. In the case of inter-coding, one or more motion vectors are used to identify the predictive block of data, while in the case of intra-coding, the prediction mode can be used to generate the predictive block. Both intra-coding and inter-coding may define several different prediction modes, which may define different block sizes and/or prediction techniques used in the coding.

The video encoder may apply transform, quantization and entropy coding processes to further reduce the bit rate associated with communication of a residual block. Transform techniques may comprise discrete cosine transforms or conceptually similar processes, such as wavelet transforms, integer transforms, or other types of transforms. In a discrete cosine transform (DCT) process, as an example, the transform process converts a set of pixel values into transform coefficients, which represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

Prior to the entropy coding process, a transformed video block of transform coefficients may be serialized by scanning the transform coefficients from a two-dimensional block into a one-dimensional vector. Typically, the scanning is performed in a zig-zag manner such that the transform coefficients in the upper-left part of a video block occur earlier in the one-dimensional vector and the transform coefficients in the lower-right part of a video block occur later. High energy transform coefficients typically reside near the upper left corner following the transform, so zig-zag scanning is effective to group non-zero transform coefficients near the beginning of the one-dimensional vector. The scanning order can significantly affect the level of compression that can be achieved in entropy coding.

Examples of entropy coding processes include content adaptive variable length coding (CAVLC) and context adaptive binary arithmetic coding (CABAC). CAVLC is one type of entropy coding technique supported by the ITU H.264/MPEG4 Part 10 AVC standard. CAVLC uses variable length coding (VLC) tables in a manner that effectively compresses serialized "runs" of quantized transform coefficients. CABAC is another type of entropy coding technique supported by the ITU H.264/MPEG4 Part 10 AVC standard. CABAC may involve several stages, including binarization, context model selection, and binary arithmetic coding. Many other types of entropy coding techniques also exist, and new entropy coding techniques will likely emerge in the future.

A video decoder may perform inverse entropy coding operations that correspond to the type of entropy coding used in the encoding process to reconstruct the one-dimensional vectors of transform coefficients. Inverse scanning may also be performed at the decoder to form two-dimensional blocks from received one-dimensional vectors of transform coefficients. The video decoder then inverse quantizes and inverse transforms the transform coefficients in a block to reconstruct residual pixel data. The video decoder may use decoded prediction information comprising a prediction mode, prediction size, and, in the case of inter coding, motion information to obtain the predictive video block. The video decoder may then combine the predictive block with the corresponding reconstructed residual block in order to generate a decoded sequence of video.

SUMMARY

In general, this disclosure describes techniques for scanning coefficients of video blocks, e.g., quantized transform coefficients. On the encoding side, the scanning creates one-dimensional vectors of coefficients from a two-dimensional block of coefficients, and on the decoding side, inverse scanning creates two-dimensional blocks of coefficients from one-dimensional vectors. Rather than using conventional zig-zag scanning, the scanning techniques described in this disclosure adapt the scanning order of coefficients in a block based on statistics associated with previously coded blocks of coefficients that were coded in the same prediction mode. For each prediction mode, statistics of the coefficients are stored, e.g., indicating probabilities that given coefficients have zero or non-zero values. Periodically, adjustments to the scanning order can be made in order to better ensure that non-zero coefficients are grouped together toward the beginning of the one-dimensional vector and zero value coefficients are grouped together toward the end of the one-dimensional vector, which can improve the effectiveness of entropy coding.

Adjustment of the scanning order can be computationally intensive. Therefore, the techniques of this disclosure may impose thresholds and threshold adjustments that can reduce the frequency at which the scanning order adjustments occur, yet still achieve desired improvements in compression due to scanning order adjustments. The techniques can be performed in a reciprocal manner by the encoder and the decoder. That is, the encoder can use the adaptive scanning techniques prior to entropy encoding to scan coefficients of video blocks from a two-dimensional format to a one-dimensional vector format. The decoder can scan received one-dimensional vectors of coefficients of video blocks to form the two-dimensional blocks of coefficients. Thus, coefficients of video blocks can be represented in a two-dimensional block format or a one-dimensional vector format. The scanning techniques of this disclosure generally define how coefficients of video blocks are converted from the two-dimensional block format to the one-dimensional vector format, and vice versa. Although this disclosure primarily focuses on the scanning of quantized transform coefficients, similar techniques could be used to scan other types of coefficients, such non-quantized coefficients or pixel values of non-transformed video blocks, e.g., if scanning of the pixel values was implemented.

In one example, this disclosure provides a method of coding coefficients of video blocks, the method comprising storing statistics associated with coefficient values of the video blocks for each of a plurality of prediction modes, counting the video blocks associated with each of the prediction modes, scanning the coefficient values of the video blocks based on scan orders defined for each of the prediction modes, evaluating a given scan order associated with a given one of the prediction modes based on the statistics of the given one of the prediction modes when a count value associated with the given one of the prediction modes satisfies a threshold of the given one of the prediction modes, and entropy coding the coefficient values.

In another example, this disclosure provides an apparatus that codes coefficients of video blocks, the apparatus comprising a scan unit and an entropy coding unit. The scan unit stores statistics associated with coefficient values of the video blocks for each of a plurality of prediction modes, counts the video blocks associated with each of the prediction modes, scans the coefficient values of the video blocks based on scan orders defined for each of the prediction modes, and evaluates a given scan order associated with a given one of the prediction modes based on the statistics of the given one of the prediction modes when a count value associated with the given one of the prediction modes satisfies a threshold of the given one of the prediction modes. The entropy coding unit entropy codes the coefficient values.

In another example, this disclosure provides a device that codes coefficients of video blocks, the device comprising means for storing statistics associated with coefficient values of the video blocks for each of a plurality of prediction modes, means for counting the video blocks associated with each of the prediction modes, means for scanning the coefficient values of the video blocks based on scan orders defined for each of the prediction modes, means for evaluating a given scan order associated with a given one of the prediction modes based on the statistics of the given one of the prediction modes when a count value associated with the given one of the prediction modes satisfies a threshold of the given one of the prediction modes, and means for entropy coding the coefficient values.

In another example, this disclosure provides a device comprising a scan unit that stores statistics associated with coefficient values of the video blocks for each of a plurality of prediction modes, counts the video blocks associated with each of the prediction modes, scans the coefficient values of the video blocks from two-dimensional blocks to one-dimensional vectors based on scan orders defined for each of the prediction modes, and evaluates a given scan order associated with a given one of the prediction modes based on the statistics of the given one of the prediction modes when a count value associated with the given one of the prediction modes satisfies a threshold of the given one of the prediction modes. The device also includes an entropy coding unit that entropy encodes the coefficient values of the one-dimensional vectors, and a wireless transmitter that sends a bitstream comprising the entropy encoded coefficient values.

In another example, this disclosure provides a device comprising a wireless receiver that receives a bitstream comprising entropy coded coefficient values of video blocks in one-dimensional vectors, an entropy coding unit that entropy decodes the coefficient values of the video blocks, and a scan unit. In this case, the scan unit stores statistics associated with coefficient values of the video blocks for each of a plurality of prediction modes, counts the video blocks associated with each of the prediction modes, scans the coefficient values of the video blocks from the one-dimensional vectors to two-dimensional blocks based on scan orders defined for each of the prediction modes, and evaluates a given scan order associated with a given one of the prediction modes based on the statistics of the given one of the prediction modes when a count value associated with the given one of the prediction modes satisfies a threshold of the given one of the prediction modes.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to code coefficients of video blocks, wherein the instructions cause the device to store statistics associated with coefficient values of the video blocks for each of a plurality of prediction modes, count the video blocks associated with each of the prediction modes, scan the coefficient values of the video blocks based on scan orders defined for each of the prediction modes, evaluate a given scan order associated with a given one of the prediction modes based on the statistics of the given one of the prediction modes when a count value associated with the given one of the prediction modes satisfies a threshold of the given one of the prediction modes, and entropy code the coefficient values.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 6 is a conceptual diagram illustrating statistics associated with blocks of a particular mode, and an algorithm consistent with the techniques of this disclosure.

DETAILED DESCRIPTION

Figure 1:
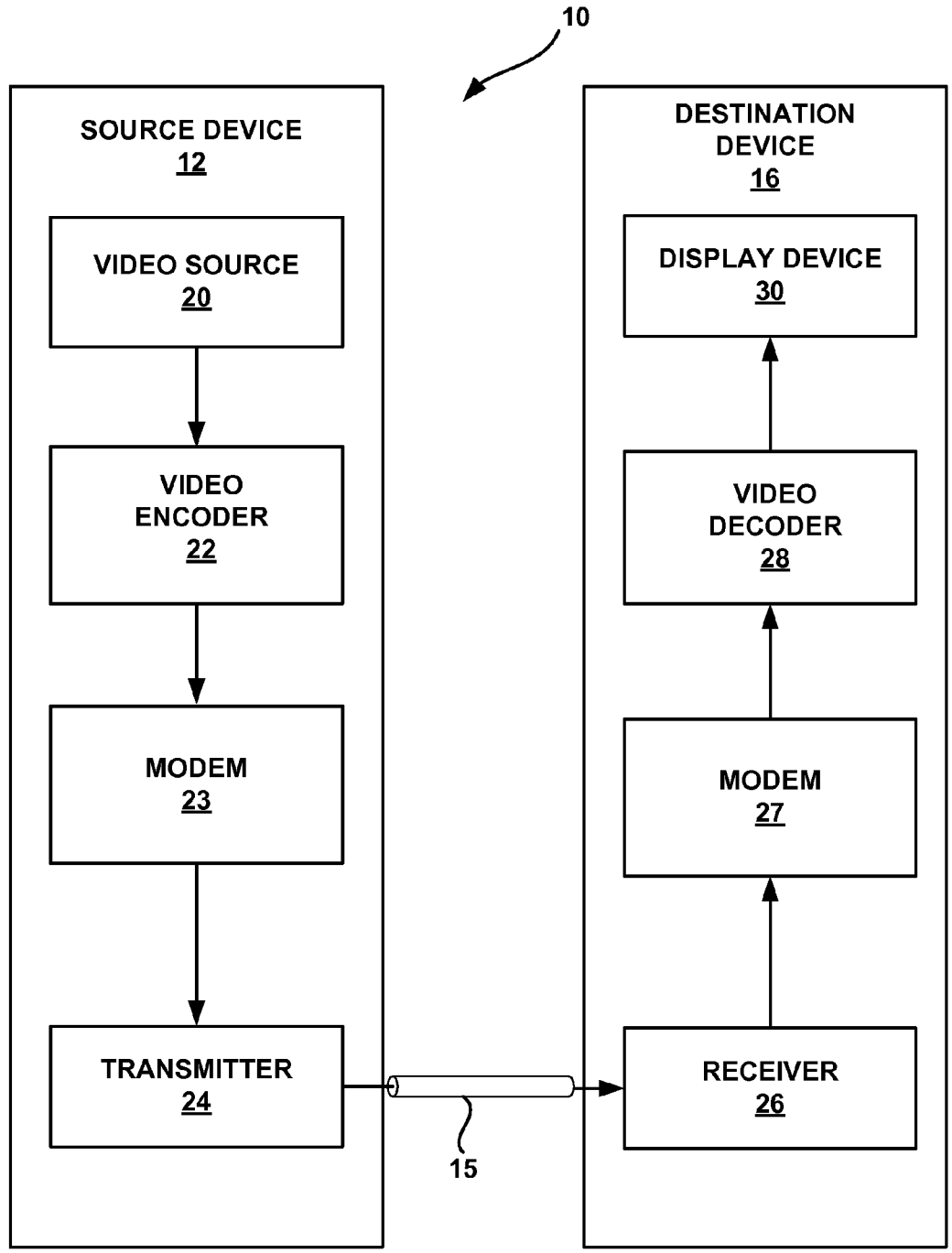
FIG. 1 is an exemplary block diagram illustrating a video encoding and decoding system.

This disclosure describes techniques for scanning coefficients of video blocks, e.g., quantized transform coefficients. In this disclosure, the term "coefficient block" generally refers to a set of transform coefficients associated with a video block. Coefficient blocks can be represented in a two-dimensional block format or one-dimensional vector format. The scanning techniques of this disclosure define how the coefficient blocks are converted from the two-dimensional block format to the one-dimensional vector format by an encoder, and how the coefficient blocks are converted from the one-dimensional vector format to the two-dimensional block format by a decoder. Although this disclosure primarily describes the scanning techniques as being applied to transformed and quantized video blocks, the scanning techniques described herein may also be applied to convert other types of video data (e.g., a video block in the pixel domain) from two-dimensional block format into one-dimensional vector format.

Conventionally, the scanning of coefficient blocks from the two-dimensional block format to the one-dimensional vector format follows a zig-zag scanning order. In this case, coefficients in the upper-left of a coefficient block occur earlier in the one-dimensional vector and the coefficients in the lower-right of a coefficient block occur later. High energy transform coefficients typically reside near the upper left hand corner following transform. For this reason, zig-zag scanning is an effective way to group non-zero coefficients near the beginning of the one-dimensional vector. The entropy coding unit then typically entropy codes the one-dimensional vector in the form of runs and levels, where runs are the number of zero value transform coefficients in between two non-zero transform coefficients, and the levels represent the values of the non-zero transform coefficients. Moreover, after the last non-zero transform coefficient is sent for a given coefficient block (e.g., in one-dimensional vector format), the entropy coder typically sends an End-Of-Block (EOB) symbol or a last coefficient flag to indicate this is the last non-zero transform coefficient in the block. By grouping non-zero transform coefficients towards the beginning of the one-dimensional vectors, higher compression can be achieved because smaller values of runs can be coded and also because the EOB symbol or the last coefficient flag can be sent more quickly. Unfortunately, zig-zag scanning does not always achieve the most effective grouping of coefficients.

Rather than use conventional zig-zag scanning, the techniques of this disclosure adapt the scanning order based on statistics associated with previously coded blocks that were coded in the same prediction mode. For each prediction mode, statistics of the transform coefficients are stored, e.g., indicating probabilities that transform coefficients at given positions are zero or non-zero. Periodically, adjustments to the scanning order can be made in order to better ensure that non-zero transform coefficients are grouped together toward the beginning of the one-dimensional vector and zero value coefficients are grouped together toward the end of the one-dimensional vector, which can improve the effectiveness of entropy coding. The adaptive scanning techniques may occur for each separate coded unit, e.g., each frame, slice, or other type of coded unit. Coefficient blocks of a coded unit may initially be scanned in a fixed way (e.g., in a zig-zag scanning order or another fixed scanning order), but may quickly adapt to a different scanning order if statistics of coefficient blocks for a given prediction mode indicate that a different scanning order would be more effective to group non-zero and zero value coefficients.

Adjustment of the scanning order, however, can be computationally intensive. Therefore, the techniques of this disclosure impose thresholds and threshold adjustments that can reduce the frequency at which the scanning order adjustments occur, yet still achieve desired improvements in compression due to such scanning order adjustments. The techniques can be performed in a reciprocal manner by the encoder and the decoder. That is, the encoder can use the adaptive scanning techniques prior to entropy encoding to scan coefficients of video blocks from two-dimensional format to one-dimensional vectors. The decoder can inverse scan received one-dimensional vectors of coefficients of video blocks following an entropy decoding process to recreate the coefficient blocks in the two-dimensional format. Again, the phrase "coefficient block" generally refers to a set of transformed coefficients represented in either a two-dimensional block format or a one-dimensional vector format.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication device handsets, such as so-called cellular or satellite radio-telephones. The techniques of this disclosure, however, which apply more generally the adaptive scanning of coefficients, are not necessarily limited to wireless applications or settings.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to perform adaptive scanning of coefficients prior to entropy encoding to form a one-dimensional set of data. Similarly, video decoder 28 of destination device 16 may be configured to perform adaptive scanning of coefficients following entropy decoding to produce a two-dimensional set of data. Video decoder 28 need not receive any indication of the scanning order applied by video encoder 22; rather, the scanning order can be derived in essentially the same way at both video encoder 22 and video decoder 28.

The illustrated system 10 of FIG. 1 is merely exemplary. The scanning techniques of this disclosure may be performed by any encoding or decoding device that supports any of a wide variety of entropy coding methodologies, such as content adaptive variable length coding (CAVLC), context adaptive binary arithmetic coding (CABAC), or other entropy coding methodologies. Source device 12 and destination device 16 are merely examples of such coding devices.

In accordance with this disclosure, video encoder 22 and video decoder 28 may store statistics associated with coefficient values of the video blocks for each of a plurality of prediction modes, and may count the video blocks associated with each of the prediction modes. Video encoder 22 and video decoder 28 scan the coefficient values of the video blocks based on scan orders defined for each of the prediction modes, evaluate a given scan order associated with a given one of the prediction modes based on the statistics of the given one of the prediction modes when a count value associated with the given one of the prediction modes satisfies a threshold of the given one of the prediction modes, and entropy coding the coefficient values. Again, on the encoding side, the scanning precedes entropy encoding, while on the decoding side, the scanning follows the entropy decoding.

In general, source device 12 generates coded video data for transmission to destination device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard or technique, and transmitted to destination device 16 via transmitter 24.

Receiver 26 of destination device 16 receives information over channel 15, and modem 27 demodulates the information. The video decoding process performed by video decoder 28 may perform entropy decoding and adaptive scanning as part of the reconstruction of the video sequence. The decoding process, like the encoding process, uses the techniques of this disclosure in order to support improved levels of data compression. Display device 28 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate according to a video compression standard that supports CAVLC, CABAC or another entropy coding methodology, such as the ITU-T H.264 standard, alternatively referred to as MPEG-4, Part 10, Advanced Video Coding (AVC). However, the techniques are described in reference to this standard merely for purposes of illustration. Such techniques may be readily applied to any of a variety of other video coding standards, such as those defined by the Moving Picture Experts Group (MPEG) in MPEG-1, MPEG-2 and MPEG-4, the ITU-T H.263 standard, the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video coding standard defined by a standards body or developed by an organization as a proprietary standard.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU H.264/MPEG-4 Part 10 AVC standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/AVC.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence includes a series of video frames. In some cases, a video sequence can be arranged as a group of pictures (GOP). Video encoder 22 operates on video blocks within individual video frames in order to encode the video data. The video blocks may have fixed or varying sizes, and may differ in size according to a specified coding standard. Each video frame may include a series of slices. Each slice may include a series of macroblocks, which may be arranged into even smaller blocks. Macroblocks typically refer to 16 by 16 blocks of data. The ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. In this disclosure, the term video blocks may refer to blocks of coefficients, e.g., transform coefficients, following a transform process such as discrete cosine transform or a conceptually similar transformation process in which a set of pixel values are transformed into the frequency domain. The transform coefficients may be quantized. The scanning techniques of this disclosure typically apply with respect to quantized transform coefficients, but may be applicable to non-quantized transform coefficients in some implementations. Moreover, the scanning techniques of this disclosure may also be applicable to blocks of pixel values (i.e., without the transform process), which may or may not be quantized blocks of pixel values. The term "coefficient" is used broadly herein to represent values of video blocks, including not only transform coefficients of coefficient blocks, but also pixel values of non-transformed video blocks.

Larger video blocks, such as macroblocks, may be divided into smaller sized video blocks. Smaller video blocks can provide better resolution, and may be used for locations of a video frame that include high levels of detail. In general, macroblocks (MBs) and the various smaller blocks may all be considered to be video blocks. Video frames may comprise decodable units, or may be divided into smaller decodable units, such as "slices." That is, a slice may be considered to be a series of video blocks, such as MBs and/or smaller sized blocks, and each slice may be an independently decodable unit of a video frame.

After prediction, a transform may be performed on the 8×8 residual block of pixels or 4×4 residual block of pixels, and an additional transform may be applied to the DC coefficients of the 4×4 blocks of pixels for chroma components or, if an intra__16×16 prediction mode is used, for luma components. Following the transform, the data may be referred to as coefficient blocks, or transformed video blocks. Following the transform, the coefficient blocks contain transform coefficients, rather than pixel values. Again, the term "coefficients" generally refers to transform coefficients, but may alternatively refer to other types of coefficients or values (e.g., pixel values without the transform process).

Following intra- or inter-based predictive coding and transformation techniques (such as the 4×4 or 8×8 integer transform used in H.264/AVC or a discrete cosine transform DCT), quantization may be performed. Other transformation techniques such as wavelet-based compression may be used. Quantization generally refers to a process in which coefficients are quantized to possibly reduce the amount of data used to represent the coefficients. The quantization process may reduce the bit depth associated with some or all of the coefficients. For example, an 8-bit value may be rounded down to a 7-bit value during quantization.

Following quantization, scanning and entropy coding may be performed according to the techniques described herein. In particular, video blocks of transform coefficients, such as 4 by 4 video blocks, 8 by 8 video blocks, or possibly other sized blocks such as 16 by 16 video blocks, can be scanned from a two-dimensional format to a one-dimensional format. The scanning order may be initialized for each coded unit and may begin in a conventional manner (e.g., the zig-zag scanning order). According to this disclosure, the scanning order may be adaptive. In particular, the scanning order may adapt for video blocks of one or more prediction modes based on statistics associated with such video blocks. The statistics may comprise a count of the number of video blocks encoded in each respective prediction mode, and a set of probabilities associated with coefficients of video blocks encoded in each prediction mode. The probabilities may comprise an indication of the likelihood that a given coefficient value in each location of the video block has a value of zero, or has a non-zero value. Alternatively, the probabilities may comprise more detailed probabilities indicative of the actual values at each location, or another type of statistical probability measure associated with coefficient values.

One or more thresholds may be defined relative to the count values. At periodic intervals (such as when macroblock boundaries are encountered), the scan order associated with the different modes of video blocks can be evaluated. When the scan order is evaluated, if the count value associated with a given prediction mode satisfies the threshold of the given prediction mode, then the scan order for that mode may be examined and possibly changed to reflect the statistics of video blocks coded in the given prediction mode. In particular, the scan order can be defined so that coefficients are scanned in the order of their probability of having non-zero values. That is, coefficient locations that have a higher probability of being non-zero are scanned prior to coefficient locations that have a lower probability of being non-zero. In this way, a conventional scanning order (such as a zig-zag scanning order) may adapt to a scanning order that groups non-zero coefficients more toward the beginning of the one-dimensional vector representations of the coefficient blocks. The decoder can calculate the same statistics and thereby determine the scanning order that was used in the encoding process. Accordingly, reciprocal adaptive scanning orders can be applied by the decoder in order to convert the one-dimensional vector representation of the coefficient blocks back to the two-dimensional block format.

As noted, the scanning order (and adaptive changes thereto) may differ for each different predictive mode. That is, statistics are maintained for each different prediction mode. This disclosure is not limited to any particular number of modes, or types of modes. The different modes may define the size of the video block and the type of prediction used in the coding process. A plurality of prediction modes may comprise a plurality of intra prediction modes and a plurality of inter prediction modes.

As an example, inter coding may support two or more modes, such as an inter prediction mode that corresponds to 4 by 4 transform block size and an inter prediction mode that corresponds to 8 by 8 transform block size. In some cases, several 4 by 4 modes such as predictive (P) and bi-directional predictive (B) modes may be supported. Inter coding may also support an 8 by 8 P mode and an 8 by 8 B mode. Furthermore, different modes may also be defined for inter coded blocks of luma and chroma information. A variety of different inter coding prediction modes may be defined, and this disclosure is not limited to any particular set of modes.

Intra coding may also support a wide range of predictive modes. For example, the intra prediction modes may comprise a plurality of 4 by 4 luma intra prediction modes, a plurality of 8 by 8 luma intra prediction modes, a plurality of 16 by 16 luma intra prediction modes, and a plurality of 8 by 8 chroma intra prediction modes. As an example, the intra prediction modes may comprise twenty-six different modes in which predictive blocks are generated based on different types of propagation, adaptation, and/or interpolation of neighboring data within the same coded unit.

Intra coding modes may comprise modes such as vertical, horizontal, DC, diagonal downleft, diagonal downright, vertical right, horizontal down, vertical left and horizontal up. Each of these different modes defines the way in which predictive blocks are generated based on neighboring data within the same coded unit. Intra coding modes may also define combinations of the modes mentioned above, such as vertical plus horizontal, DC plus vertical, DC plus horizontal, diagonal downleft plus horizontal, diagonal downright plus vertical, vertical right plus horizontal, horizontal down plus vertical, vertical left plus horizontal and horizontal up plus vertical. Details of these particular modes are set forth in the following document, which is incorporated herein by reference: Y. Ye and M. Karczewicz, "Improved Intra Coding," ITU-T Q.6/SG16 VCEG, C257, Geneva, Switzerland, June 2007. In any case, this disclosure is not limited to any particular number of modes, or types of modes. Basically, a predictive mode may define the size of the encoded block, the size of the predictive block, the size of the transform used, and the way in which the data of the predictive block is located or generated.

Figure 2:
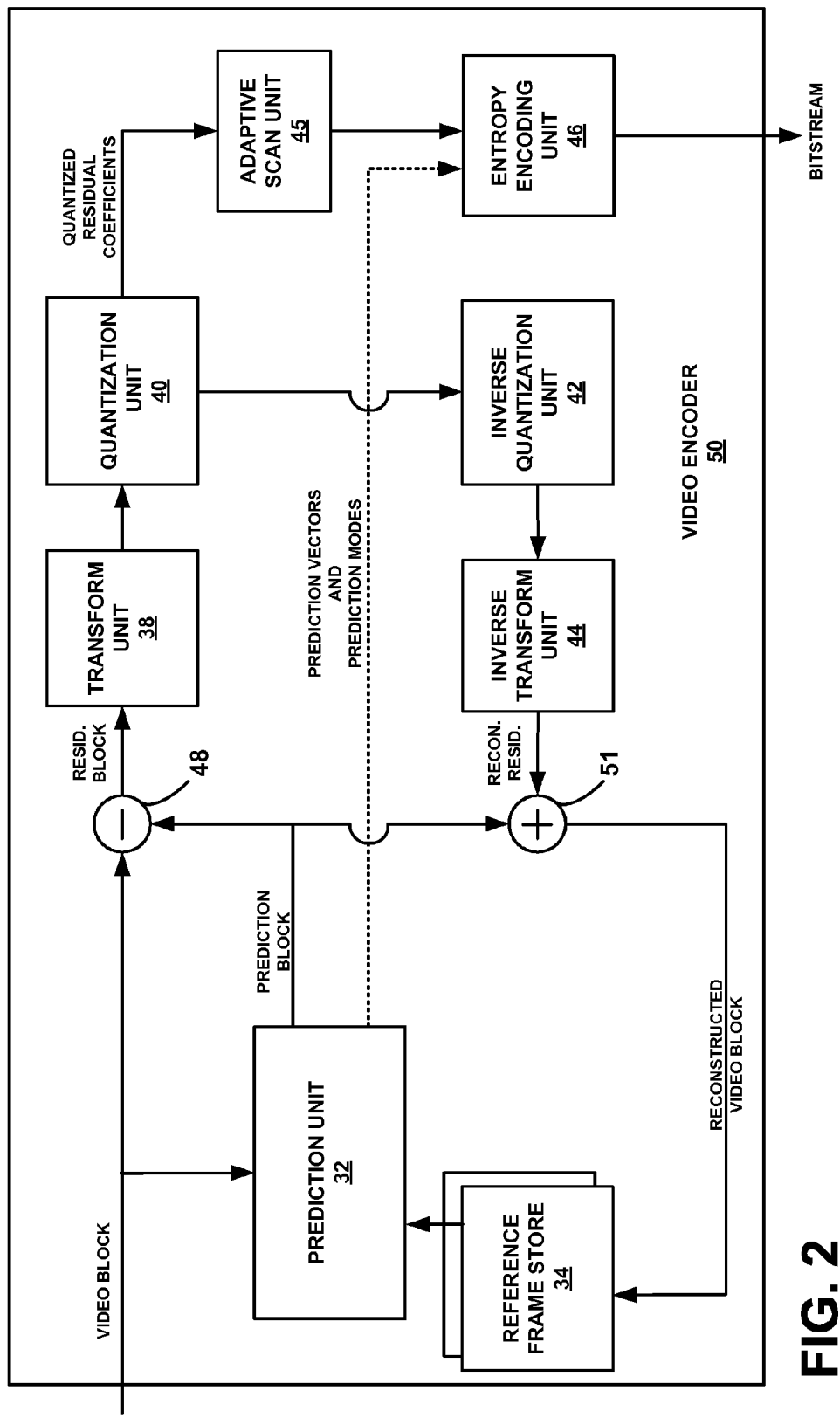
FIG. 2 is a block diagram illustrating an example of a video encoder consistent with this disclosure.

FIG. 2 is a block diagram illustrating an example of a video encoder 50 that includes an adaptive scan unit 45 that performs techniques of this disclosure to scan video blocks from a two-dimensional block format to a one dimensional vector format. As shown in FIG. 2, video encoder 50 receives a current video block within a video frame to be encoded. In the example of FIG. 2, video encoder 50 includes prediction unit 32, reference frame store 34, block transform unit 38, quantization unit 40, inverse quantization unit 42, inverse transform unit 44, adaptive scan unit 45 and entropy encoding unit 46. A deblocking filter (not shown) may also be included to filter block boundaries to remove blockiness artifacts. Video encoder 50 also includes summer 48 and summer 51.

For inter coding, prediction unit 32 compares the video block to be encoded to various blocks in one or more video reference frames. For inter coding, prediction unit 32 predicts the video block to be encoded from already coded neighboring video blocks of the same coded unit. The predicted data may be retrieved from reference frame store 34, which may comprise any type of memory or data storage device to store video blocks reconstructed from previously encoded blocks. Prediction unit 32 may generate prediction modes and prediction vectors, which comprise syntax elements that may be used to identify the prediction blocks used to code the current video block. For intra coding, prediction unit 32 may comprise a spatial prediction unit, while for inter coding, prediction unit 32 may include motion estimation and motion compensation units.

Video encoder 50 forms a residual video block by subtracting the prediction block produced by prediction unit 32 from the original video block being encoded. Summer 48 represents a unit or module that performs this subtraction operation. Block transform unit 38 applies a transform, such as a discrete cosine transform (DCT) or a conceptually similar transform, to the residual block, producing a video block comprising residual transform block coefficients. Block transform unit 38, for example, may perform other transforms defined by the H.264 standard, which are conceptually similar to DCT.

Quantization unit 40 quantizes the residual transform coefficients to further reduce bit rate. Quantization unit 40, for example, may limit the number of bits used to code each of the coefficients. After quantization, adaptive scan unit 45 scans the quantized coefficient block from a two-dimensional representation to a one-dimensional vector. Then, following this scanning process, entropy encoding unit 46 encodes the quantized transform coefficients according to an entropy coding methodology, such as CAVLC or CABAC, to further compress the data. The adaptive scanning performed by adaptive scan unit 45, consistent with this disclosure, is outlined in greater detail below.

Briefly, adaptive scan unit 45 stores statistics associated with coefficient values of the video blocks for each of a plurality of prediction modes, counts the video blocks associated with each of the prediction modes, scans the coefficient values of the video blocks based on scan orders defined for each of the prediction modes, and evaluates a given scan order associated with a given one of the prediction modes based on the statistics of the given one of the prediction modes when a count value associated with the given one of the prediction modes satisfies a threshold of the given one of the prediction modes. Then, following this scanning process, entropy encoding unit 46 encodes the quantized transform coefficients according to an entropy coding methodology.

Adaptive scan unit 45 may determine a new scan order associated with the given one of the prediction modes based on the statistics of the given one of the prediction modes when the count value associated with the given one of the prediction modes satisfies the threshold of the given one of the prediction modes. In addition, adaptive scan unit 45 may adjust the threshold upon adjusting the given scan order. The statistics stored by adaptive scan unit 45 may comprise statistics indicative of the probability of the coefficient values being zero or non-zero. In one example, adaptive scan unit 45 determines a new scan order associated with the given one of the prediction modes based on the statistics of the given one of the prediction modes, and increases or decreases the threshold based on whether the new scan order is the same as a previous scan order. For example, if the new scan order is the same as a previous scan order, adaptive scan unit 45 may increase the threshold of the given one of the prediction modes, e.g., by a factor of two subject to an upper limit. Similarly, if the new scan order is different than the previous scan order, adaptive scan unit 45 may decrease the threshold of the given one of the prediction modes, e.g., by a factor of two subject to a lower limit. Upon determining the scan order of the given one of the prediction modes, adaptive scan unit 45 may re-set the count value associated with the given one of the prediction modes. Once the coefficient blocks are scanned into a one-dimensional format, entropy encoding unit 46 entropy encodes the quantized transform coefficients.

Following the entropy coding by entropy encoding unit 46, the encoded video may be transmitted to another device or archived for later transmission or retrieval. Inverse quantization unit 42 and inverse transform unit 44 apply inverse quantization and inverse transformation, respectively, to reconstruct the residual block in the pixel domain. Summer 51 adds the reconstructed residual block to the prediction block produced by prediction unit 32 to produce a reconstructed video block for storage in reference frame store 34. If desired, the reconstructed video block may also go through a deblocking filter unit (not shown) before being stored in reference frame store 34. The reconstructed video block may be used by prediction unit 32 as a reference block to inter-code a block in a subsequent video frame or to intra-code a future neighboring block within the same coded unit.

Figure 3:
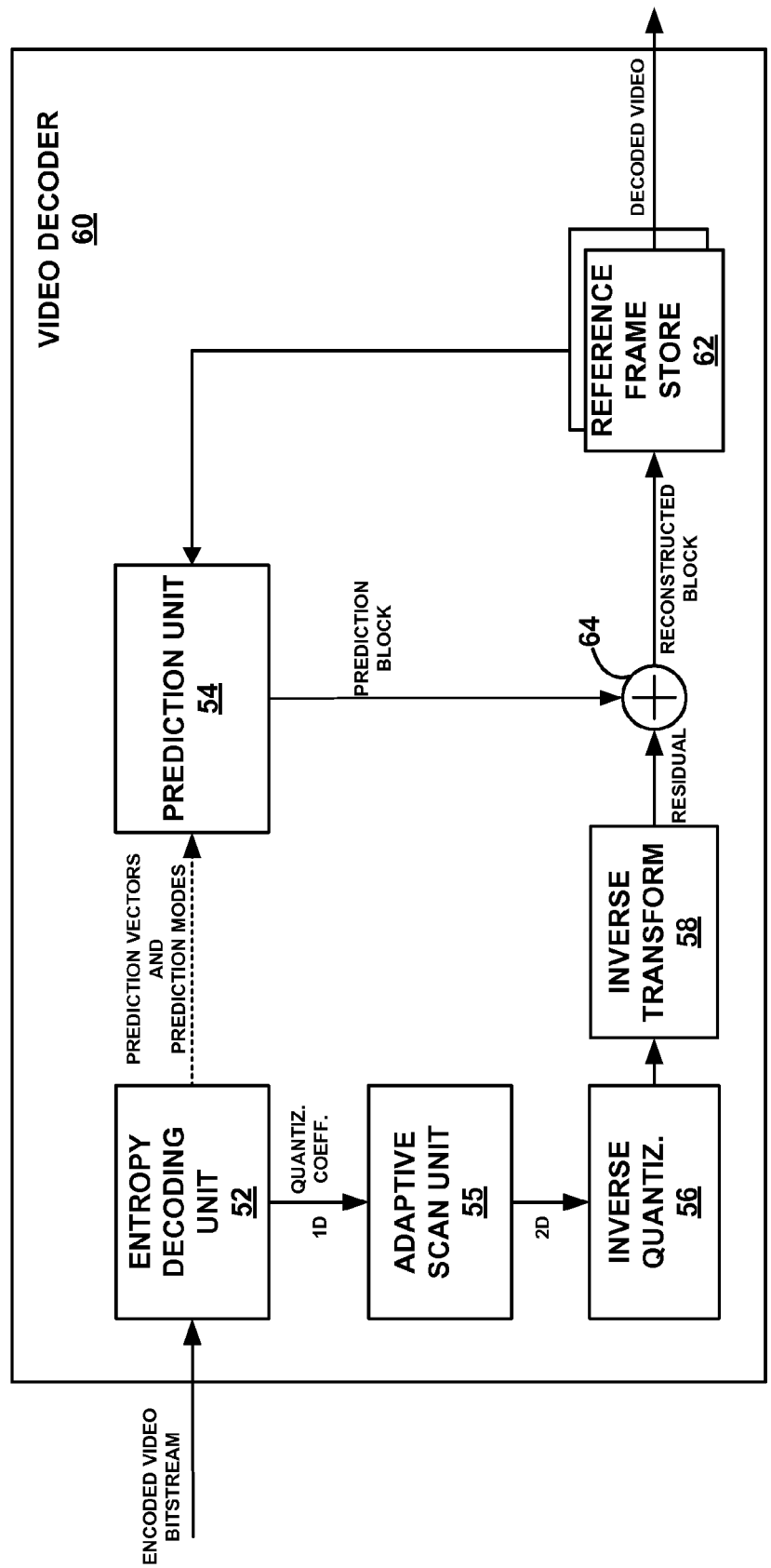
FIG. 3 is a block diagram illustrating an example of a video decoder consistent with this disclosure.

FIG. 3 is a block diagram illustrating an example of a video decoder 60, which decodes a video sequence that is encoded in the manner described herein. Video decoder 60 includes an entropy decoding unit 52 that performs the reciprocal decoding function of the encoding performed by entropy encoding unit 46 of FIG. 2. Video decoder 60 also includes an adaptive scan unit 55 that performs inverse scanning that is reciprocal to the scanning performed by adaptive scan unit 45 of FIG. 2.

Video decoder 60 may perform intra- and inter-decoding of blocks within video frames. In the example of FIG. 3, video decoder 60 also includes a prediction unit 54, an inverse quantization unit 56, an inverse transform unit 58, and reference frame store 62. Video decoder 60 also includes summer 64. Optionally, video decoder 60 also may include a deblocking filter (not shown) that filters the output of summer 64.

For intra coding, prediction unit 54 may comprise a spatial prediction unit, while for inter coding, prediction unit 54 may comprise a motion compensation unit. Inverse quantization unit 56 performs inverse quantization, and inverse transform unit 58 performs inverse transforms to change the coefficients of the video blocks back to the pixel domain. Summer combines a prediction block from unit 54 with the reconstructed residual block from inverse transform unit 58 to generate a reconstructed block, which is stored in reference frame store 62. If desired, the reconstructed video block may also go through a deblocking filter unit (not shown) before being stored in reference frame store 62. Decoded video is output from reference frame store 62, and may also be fed back to prediction unit 54 for use in subsequent predictions.

As noted, entropy decoding unit 52 performs the reciprocal decoding function of the encoding performed by entropy encoding unit 46 of FIG. 2, and adaptive scan unit 55 then performs reciprocal scanning of that performed by adaptive scan unit 45 of FIG. 2. Like adaptive scan unit 45 of FIG. 2, adaptive scan unit 55 of FIG. 3 stores statistics associated with coefficient values of the video blocks for each of a plurality of prediction modes, counts the video blocks associated with each of the prediction modes, scans the coefficient values of the video blocks based on scan orders defined for each of the prediction modes, and evaluates a given scan order associated with a given one of the prediction modes based on the statistics of the given one of the prediction modes when a count value associated with the given one of the prediction modes satisfies a threshold of the given one of the prediction modes. Basically, adaptive scan unit 55 performs similar functions to adaptive scan unit 45, but does so in the reverse manner. Thus, whereas adaptive scan unit 45 scans coefficient blocks from a two-dimensional format to a one-dimensional format prior to entropy encoding, adaptive scan unit 55 scans coefficient blocks from the one-dimensional format to the two-dimensional format following entropy decoding.

Figure 4:
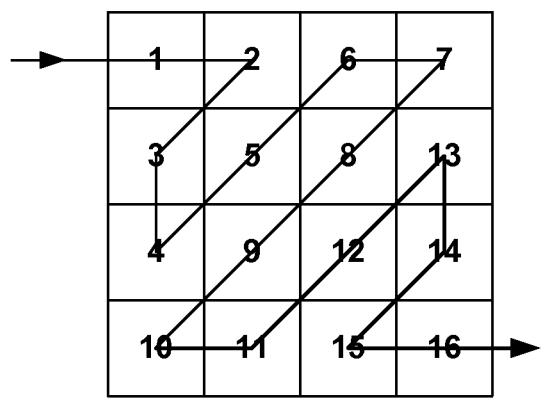
FIG. 4 is a conceptual diagram illustrating zig-zag scanning of a 4-by-4 video block.
Figure 5:
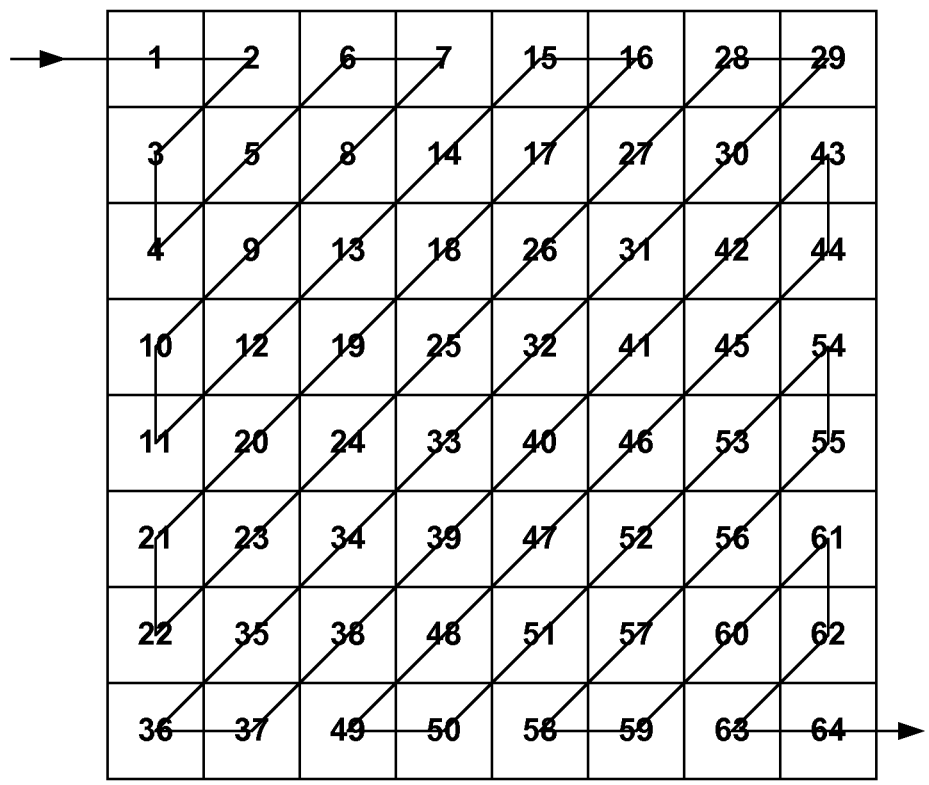
FIG. 5 is a conceptual diagram illustrating zig-zag scanning of an 8-by-8 video block.

FIG. 4 is a conceptual diagram illustrating zig-zag scanning of a 4 by 4 coefficient block. FIG. 5 is a conceptual diagram illustrating zig-zag scanning of an 8 by 8 coefficient block. The zig-zag scanning shown in FIGS. 4 and 5 may be performed by adaptive scanning unit 45 at the beginning of the coding process for a coded unit. As discussed in greater detail below, however, the scanning order may adapt based on the actual statistics associated with the already coded coefficient blocks.

The scanning order for such zig-zag scanning shown in FIGS. 4 and 5 follows the arrow through video blocks 80 and 90, and the coefficients are labeled in the scanning order. In particular, the numerical values shown in FIGS. 4 and 5 indicate positions of the coefficients within a sequential one-dimensional vector, and do not represent values of the coefficients. At initialization, the techniques of this disclosure are not limited to any particular scanning order or technique. For example, the initial scanning orders used in this disclosure may be the zig-zag scanning orders shown in FIGS. 4 and 5. Or, alternatively, the initial scanning orders used in this disclosure may be a set of fixed scanning orders that may be specially trained for each one of a plurality of prediction modes. As zig-zag scanning is quite typical, it provides a good starting point for discussion of the adaptive scanning of this disclosure. Again, according to this disclosure, the scanning order adapts over time based on the actual statistics associated with the already coded coefficient blocks. For each coded unit, the scanning order may begin with a conventional scanning order, such as zig-zag scanning, but adapts as statistics accumulate for coefficient blocks coded in the different prediction modes within that coded unit. As noted above, however, zig-zag scanning is not the only possible starting point for adaptive scanning. Horizontal scanning, vertical scanning, or any initial scanning technique may be used as a starting point for the adaptive scanning techniques described herein.

FIG. 6 is a conceptual diagram illustrating an exemplary set of statistics (S1-S16) associated with blocks of a particular prediction mode, and an algorithm consistent with the techniques of this disclosure. As shown, the initial scanning order of a video block in Mode X may be defined by a zig-zag scanning process as follows: (S1, S2, S5, S9, S6, S3, S4, S7, S10, S13, S14, S11, S8, S12, S15, S16). In this case, the numbered coefficients correspond to the statistics that are numbered in statistics block 69 of FIG. 6. Count(mode X) defines a count of a number of blocks coded in Mode X for a given coded unit. With each increment of Count(mode X) the statistics (S1-S16) may change to reflect the statistics of the coefficients, as affected by the new block in mode X.

Algorithm 60 of FIG. 6 may be invoked at predefined update interval in the coding of a coded unit (e.g., a frame or slice), such as when macroblock boundaries are encountered. According to this disclosure, once algorithm 60 is invoked, if Count(mode X) is greater than or equal to a pre-defined threshold, scan unit 45 or 55 (FIG. 2 or 3) selects a scan order based on the statistics S1-S16, and then re-sets Count(mode X). If the scan order changes, scan unit 45 or 55 may adjust the threshold downward, and if the scan order does not change, scan unit 45 or 55 may adjust the threshold upward.

The threshold is basically a mechanism that can limit the occurrence of scan order changes, which usually requires computationally intensive sorting process, and can ensure that sufficient statistics are accumulated for a given mode of video block prior to evaluating the scan order. In particular, a new scan order can only be selected for a given mode of video block when the count of the given mode satisfies the threshold of the given mode. Furthermore, the threshold may adjust over time in order to accelerate the occurrence of scan order evaluations when new scan orders are different than previous scan orders, or to reduce the occurrence of scan order evaluations when new scan orders remain the same as previous scan orders. In this way, for each of a plurality of prediction modes, the techniques described herein may perform scan order evaluations more frequently at the beginning of the code unit until the scan order reaches a steady and desirable state, and may then perform scan order selections less frequently as changes in scan orders become less likely.

Figure 7:
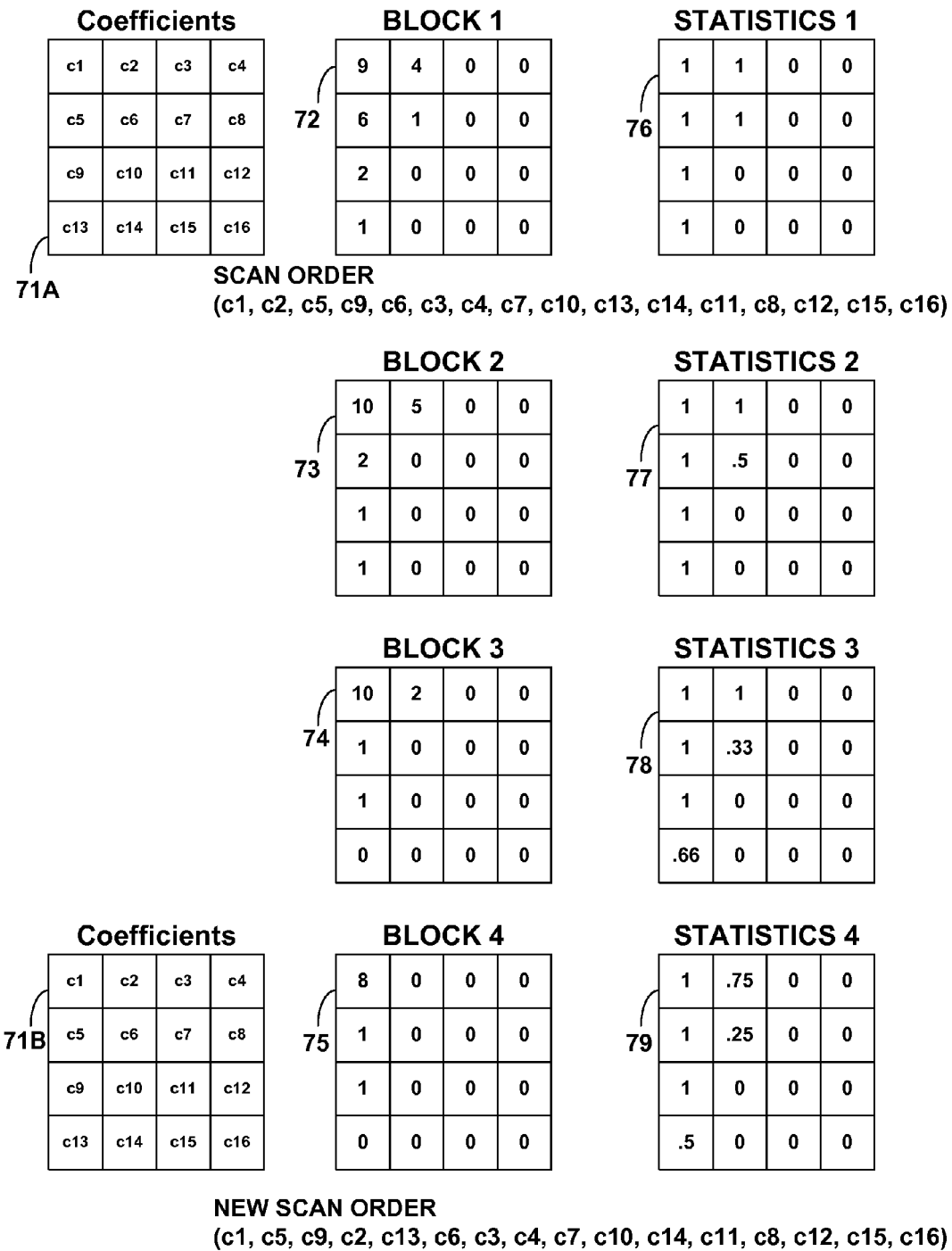
FIG. 7 is a conceptual diagram illustrating a hypothetical example consistent with this disclosure.

FIG. 7 is a conceptual diagram illustrating a hypothetical example consistent with this disclosure. In this example, coefficients are labeled in items 71A and 71B as c1-c16. Actual coefficient values are shown in block 1 (72), block 2 (73), block 3 (74) and block 4 (75). Blocks 1-4 may comprise blocks associated with the same prediction mode. Blocks 1-4 may be coded in sequence.

Initially, zig-zag scanning may be used. In this case, the blocks are scanned in the following order, which is consistent with the illustration of FIG. 4:

(c1, c2, c5, c9, c6, c3, c4, c7, c10, c13, c14, c11, c8, c12, c15, c16).

Assuming the statistics of coefficient blocks are initialized to be all zero, statistics 1 (76) represents the statistics of block 1, e.g., with values of one for any coefficient that is non-zero and values of zero for any coefficient that has a value of zero. Statistics 2 (77) represents the combined statistics of blocks 1 and 2, e.g., with normalized probability values indicative of whether that coefficient location was one or zero in blocks 1 and 2. In this case, the normalized probability of the location c6 is 0.5 since block 1 had a non-zero coefficient at that location, but block 2 had a zero value coefficient at that location. Statistics 3 (78) represents the combined statistics of blocks 1, 2 and 3 as normalized probabilities, and statistics 4 (79) represent the combined statistics of blocks 1, 2, 3 and 4 as normalized probabilities. The normalized probabilities may comprise an average of the values of one or zero for every given location, wherein the value of one is given for a particular location of the block if that location of the block defines a non-zero coefficient. In the descriptions above, zig-zag scan is used as the initial scanning order and the statistics of the coefficient blocks are initialized to be all zero. Such initializations are given only as an example, and alternative initialization of the scanning order and the coefficient statistics may be used.

In the example of FIG. 7, one may assume that the threshold is set at a value of 4. In this case, upon coding the fourth block 75, once the preset updating interval is encountered (e.g., once a macroblock boundary is encountered), the count of 4 blocks is determined to satisfy the threshold of 4. In this case, the sorting algorithm is invoked, and scan unit 45 (FIG. 2) may define a new scan order based on statistics 4 (79). Accordingly, the new scan order is as follows:

($c_1$, $c_5$, $c_9$, $c_2$, $c_{13}$, $c_6$, $c_3$, $c_4$, $c_7$, $c_{10}$, $c_{14}$, $c_{11}$, $c_8$, $c_{12}$, $c_{15}$, $c_{16}$)

In particular, the scanning order changes from an initial scan order (e.g., zig-zag scanning) to a new scan order that promotes non-zero coefficients at the beginning of the one-dimensional vector, and zero coefficients at the end. For example, since the probability at locations $c_5$ and $c_9$ are higher than that at $c_2$ in statistics 4 (79), $c_5$ and $c_9$ are both scanned before $c_2$ in the new scanning order. Unlike the zig-zag scanning which alternates between the horizontal dimension and the vertical dimension equally, the new scan order exhibits stronger directionality in the vertical dimension. That is, the new scan order goes through coefficients in the vertical dimension faster than the coefficients in the horizontal dimension, which is consistent with the statistical distribution of the coefficients of the video blocks 1-4 (72, 73, 74, 75) coded in a given prediction mode. Thus, by using past statistics to define the scan order, the techniques of this disclosure may promote grouping of non-zero coefficients near the beginning of a scanned one-dimensional vector and zero value coefficients near the end of the scanned one-dimensional vector. This, in turn, can improve the level of compression that can be achieved during entropy coding.

Furthermore, thresholds are defined to limit the occurrence of scan order changes since such changes require computationally intensive sorting process, and to help ensure that sufficient statistics are accumulated for a given mode of a video block prior to evaluating the scan order. In this case, a new scan order can only be selected for a given mode of video block when the count of the given mode satisfies the threshold of the given mode. The threshold may adjust upward or downward over time (subject to upper and lower bounds). For example, if a scan order evaluation results in scan order changes, the threshold may be reduced so that a subsequent scan order evaluation occurs more quickly. In this case, since the scan orders are changing, it may be desirable to speed the occurrence of future changes to bring the scan order into a steady state. On the other hand, if a scan order evaluation does not result in a scan order change, the threshold may be increased so that a subsequent scan order evaluation takes longer to occur. In this case, since scan order has not changed, it may be desirable to reduce the frequency of evaluation of possible scan order changes, since these evaluations require the use of processing resources. These types of threshold adjustments may evaluate scan order changes more frequently until the scan order reaches a steady and desirable state, and may then limit the frequency of scan order evaluations as changes become less likely.

Figure 8:
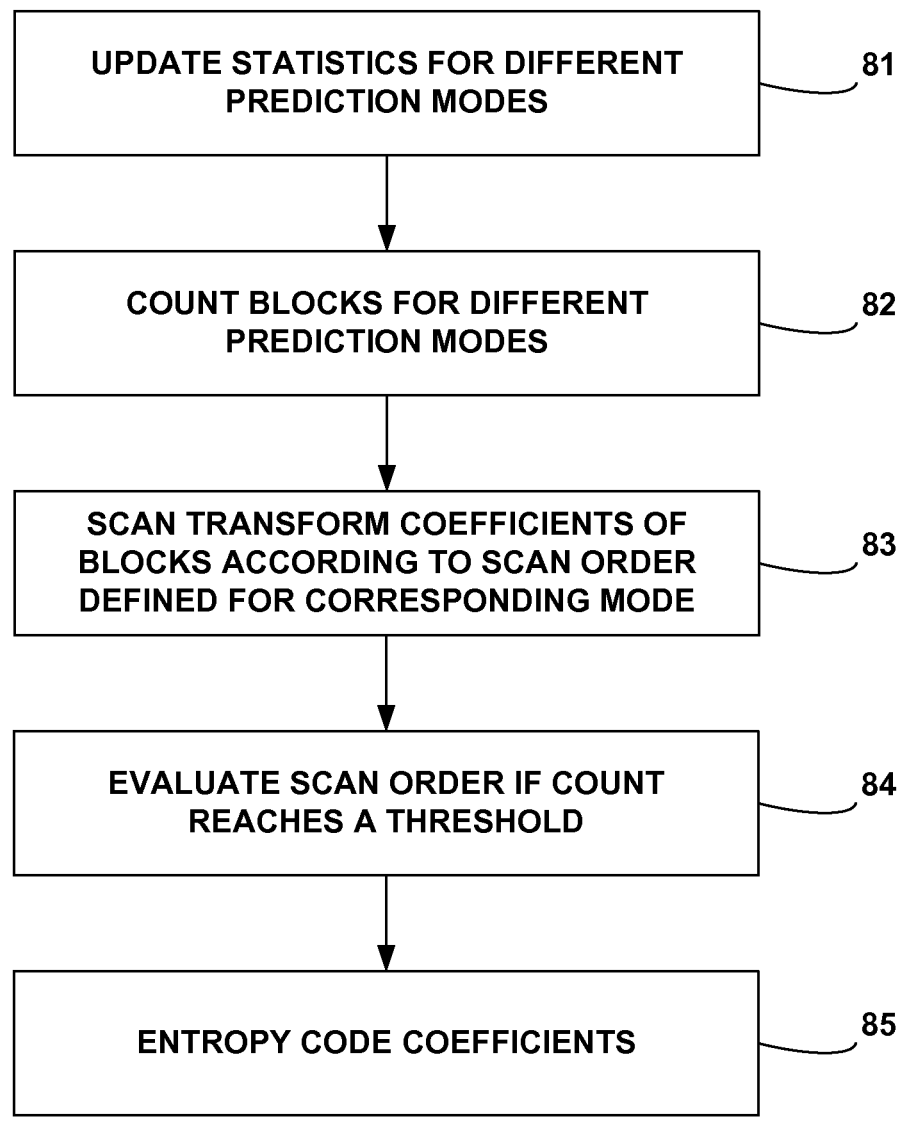
FIGS. 8 and 9 are flow diagrams illustrating techniques consistent with this disclosure.

FIG. 8 is a flow diagram illustrating a coding (i.e., encoding or decoding) technique consistent with this disclosure. FIG. 8 is illustrated from the perspective of video encoder 50 insofar as the step of entropy coding (step 85) is after the step of scanning (step 83). From the perspective of video decoder 60, the step of entropy coding (step 85) would precede the step of scanning (step 83). For example, from the perspective of video decoder 60, the steps shown in FIG. 8 may be performed in the following order (step 85, step 83, step 81, step 82, step 84). For purposes of simplicity, FIG. 8 is described below from the perspective of video encoder 50.

As shown in FIG. 8, adaptive scan unit 45 updates statistics associated with coefficient values of the video blocks for each of a plurality of prediction modes (81), and counts the video blocks associated with each of the prediction modes (82). Adaptive scan unit 45 then scans the coefficient values of the video blocks into one-dimensional coefficient vectors according to scan orders defined for each of the prediction modes (83), and evaluates a given scan order associated with a given one of the prediction modes based on the statistics of the given one of the prediction modes when a count value associated with the given one of the prediction modes satisfies a threshold of the given one of the prediction modes (84). Then, following this scanning process, entropy encoding unit 46 encodes the one-dimensional coefficient vectors according to an entropy coding methodology (85).

Adaptive scan unit 45 may determine a new scan order associated with the given one of the prediction modes based on the statistics of the given one of the prediction modes when the count value associated with the given one of the prediction modes satisfies the threshold of the given one of the prediction modes. In addition, adaptive scan unit 45 may adjust the threshold upon determining the given scan order. As discussed in this disclosure, the statistics stored by adaptive scan unit 45 may comprise statistics indicative of the probabilities of the coefficient values being zero or non-zero, or possibly other types of statistics indicative of the probabilities of coefficients values. In one example, adaptive scan unit 45 determines a new scan order associated with the given one of the prediction modes based on the statistics of the given one of the prediction modes, and increases or decreases the threshold based on whether the new scan order is the same as a previous scan order.

For example, if the new scan order is the same as a previous scan order, adaptive scan unit 45 may increase the threshold, e.g., by a factor of two subject to an upper limit. Similarly, if the new scan order is different than the previous scan order, adaptive scan unit 45 may decrease the threshold, e.g., by a factor of two subject to a lower limit. Upon determining the new scan order, adaptive scan unit 45 may re-set the count value associated with the given one of the prediction modes. Once scanned into a one-dimensional format, entropy encoding unit 46 entropy encodes the coefficient vectors.

Figure 9:
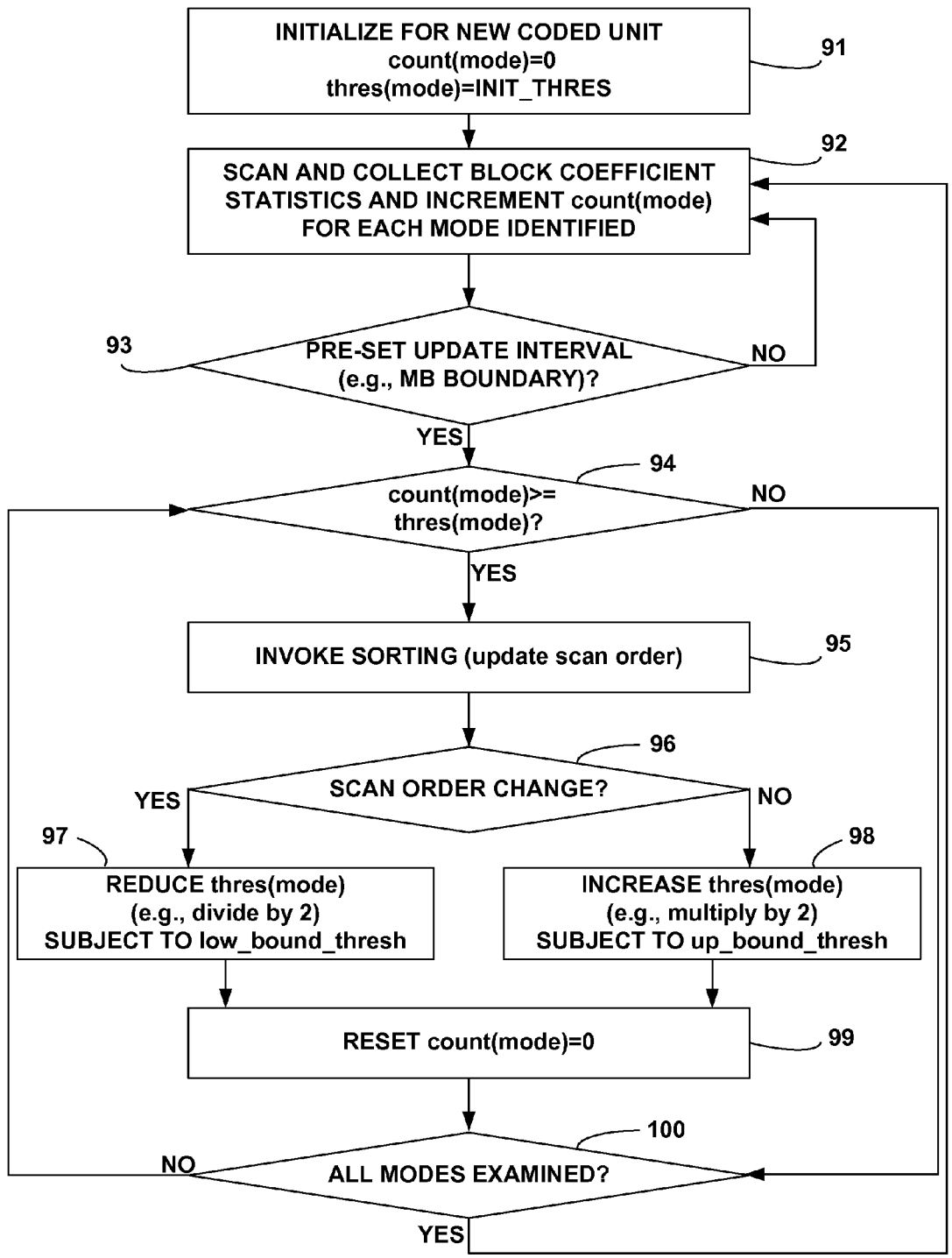

FIG. 9 is an exemplary flow diagram illustrating an adaptive scanning process that may be performed by scan unit 45 of video encoder 50 (FIG. 2) and scan unit 55 of video decoder 60 (FIG. 3). The process of FIG. 9 may repeat for each coded unit. Again, coded units may comprise individual frames of a video sequence, portions of frames (such as slices), or another independently decodable unit of a video sequence.

As shown in FIG. 9, scan unit 45 initializes its scanning order for a new coded unit (91). In other words, at the beginning of a frame or slice, the scanning order is initialized. The count values for every mode are set to zero, and the thresholds are set to an initial value, such as a value of 4 for modes that correspond to 4 by 4 blocks and a value of 2 for modes that correspond to 8 by 8 blocks. At the beginning of a new coded unit, statistics of coefficient blocks for every mode are also initialized, either to all zero or other statistics based on empirical training. Scan unit 45 applies its initial scanning order (e.g., zig-zag scanning). In doing so, scan unit 45 collects block coefficient statistics and increments count(mode) for each mode identified for the scanned blocks (92). This process continues until a preset update interval is reached (93). For example, the preset update interval may correspond to a macroblock boundary, or another pre-determined interval.

When the pre-set update interval is identified ("yes" 93), scan unit 45 evaluates the scan order. In particular, scan unit 45 determines whether count(mode) satisfies the threshold thresh(mode) (94). If not ("no" 94), scan unit 45 considers the other modes, e.g., until all the modes are examined (100). For any given mode, if the count(mode) satisfies the threshold ("yes" 94), scan unit 45 invokes a sorting function, which updates the scan order (95) based on the accumulated statistics for that mode. If the scan order changes as a result of this update in the scan order ("yes" 96), scan unit 45 reduces thres(mode) for that mode (97). If the scan order does not change as a result of this update in the scan order ("no" 96), scan unit 45 increases thres(mode) for that mode (98). As an example, these increases (98) or reductions (97) in the thresholds may be changed by a factor of two (i.e., multiply by 2 or divide by 2) subject to lower and upper bounds. The lower and upper bounds may be set to 4 for modes that correspond to 4 by 4 blocks and a value of 2 for modes that correspond to 8 by 8 blocks. In this example, the initial thresholds may be set at the lower bounds in order to invoke sorting as quickly as possible following initialization.

Once the scan order for a given mode is updated (95), the count(mode) for that mode is reset to zero (99). The process then determines whether additional modes need to be examined (100). The process continues as a given coded unit (e.g., a frame or a slice) is coded. That is, a new initialization (91) may occur when the next coded unit is encountered.

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. The techniques have been described in the context of scanning of transformed coefficients of transformed video blocks, but might also apply to scanning of other types of coefficients of video blocks. For example, if scanning of pixel values or other types of non-transformed coefficients or values associated with video blocks were implemented, the techniques of this disclosure could apply to such scanning. These and other aspects are within the scope of the following claims.

The invention claimed is:

1. A method of coding coefficients of video blocks, the method comprising:
   storing statistics associated with coefficient values of the video blocks for each of a plurality of prediction modes;
   counting the video blocks associated with each of the prediction modes;
   scanning the coefficient values of the video blocks based on scan orders defined for each of the prediction modes;
   evaluating a given scan order associated with a given one of the prediction modes based on the statistics of the given one of the prediction modes when a count value indicative of a plurality of blocks counted for the given one of the prediction modes satisfies a threshold of the given one of the prediction modes;
   determining a new scan order associated with the given one of the prediction modes based on the statistics of the given one of the prediction modes when the count value indicative of the plurality of blocks counted for the given one of the prediction modes satisfies the threshold of the given one of the prediction modes;
   adjusting the threshold of the given one of the prediction modes upon adjusting the given scan order of the given one of the prediction modes; and
   entropy coding the coefficient values.

2. The method of claim 1, wherein storing the statistics comprises for each of the plurality of prediction modes:
   storing statistics indicative of probabilities of the coefficient values being zero or non-zero.

3. The method of claim 1, further comprising:
   determining a new scan order associated with the given one of the prediction modes based on the statistics of the given one of the prediction modes;
   if the new scan order is the same as a previous scan order, increasing the threshold of the given one of the prediction modes;
   if the new scan order is different than the previous scan order, decreasing the threshold of the given one of the prediction modes; and
   re-setting the count value indicative of a plurality of blocks counted for the given one of the prediction modes.

4. The method of claim 1, wherein the plurality of prediction modes comprise a plurality of intra prediction modes and a plurality of inter prediction modes.

5. The method of claim 4,
   wherein the intra prediction modes comprise a plurality of 4 by 4 luma intra prediction modes, a plurality of 8 by 8 luma intra prediction modes, a plurality of 16 by 16 luma intra prediction modes, and a plurality of 8 by 8 chroma intra prediction modes; and wherein the inter prediction modes comprise inter prediction modes corresponding to a 4 by 4 block size and an 8 by 8 block size.

6. The method of claim 1, wherein entropy coding comprises content adaptive variable length coding (CAVLC) or context adaptive binary arithmetic coding (CABAC).

7. The method of claim 1, further comprising generating the coefficient values via a transform of the video blocks from a pixel domain to a transformed domain.

8. The method of claim 1, wherein coding comprises encoding,
wherein scanning the coefficient values of the video blocks comprises generating one-dimensional vectors of coefficients from two-dimensional blocks of coefficients based on scan orders defined for each of the prediction modes, and
wherein entropy coding comprises entropy encoding the one-dimensional vectors after scanning the coefficient values.

9. The method of claim 1, wherein coding comprises decoding,
wherein scanning the coefficient values of the video blocks comprises generating two-dimensional blocks of coefficients from one-dimensional vectors of coefficients based on scan orders defined for each of the prediction modes, and
wherein entropy coding comprises entropy decoding the one-dimensional vectors prior to scanning the coefficient values.

10. The method of claim 1, further comprising examining the scan orders defined for each of the prediction modes at a pre-set update interval.

11. The method of claim 1, wherein the method is repeated for each of a plurality of coded units that form a video sequence, the method further comprising:
initializing the scan orders, the statistics and thresholds for each of the prediction modes prior to the method being repeated for each of the plurality of coded units.

12. An apparatus that codes coefficients of video blocks, the apparatus comprising:
a scan unit that:
stores statistics associated with coefficient values of the video blocks for each of a plurality of prediction modes;
counts the video blocks associated with each of the prediction modes;
scans the coefficient values of the video blocks based on scan orders defined for each of the prediction modes; an 4
evaluates a given scan order associated with a given one of the prediction modes based on the statistics of the given one of the prediction modes when a count value indicative of a plurality of blocks counted for the given one of the prediction modes satisfies a threshold of the given one of the prediction modes;
determines a new scan order associated with the given one of the prediction modes based on the statistics of the given one of the prediction modes when the count value indicative of the plurality of blocks counted for the given one of the prediction modes satisfies the threshold of the given one of the prediction modes;
adjusts the threshold of the given one of the prediction modes upon adjusting the given scan order of the given one of the prediction modes; and an entropy coding unit that entropy codes the coefficient values.

13. The apparatus of claim 12, wherein the scan unit for each of the plurality of prediction modes:
stores statistics indicative of probabilities of the coefficient values being zero or non-zero.

14. The apparatus of claim 12, wherein the scan unit:
determines a new scan order associated with the given one of the prediction modes based on the statistics of the given one of the prediction modes;
if the new scan order is the same as a previous scan order, increases the threshold of the given one of the prediction modes;
if the new scan order is different than the previous scan order, decreases the threshold of the given one of the prediction modes; and
re-sets the count value indicative of a plurality of blocks counted for the given one of the prediction modes.

15. The apparatus of claim 12, wherein the plurality of prediction modes comprise a plurality of intra prediction modes and a plurality of inter prediction modes.

16. The apparatus of claim 15,
wherein the intra prediction modes comprise a plurality of 4 by 4 luma intra prediction modes, a plurality of 8 by 8 luma intra prediction modes, a plurality of 16 by 16 luma intra prediction modes, and a plurality of 8 by 8 chroma intra prediction modes; and
wherein the inter prediction modes comprise inter prediction modes corresponding to a 4 by 4 block size and an 8 by 8 block size.

17. The apparatus of claim 12, wherein the entropy coding unit performs content adaptive variable length coding (CAVLC) or context adaptive binary arithmetic coding (CABAC).

18. The apparatus of claim 12, further comprising a transform unit that generates the coefficient values via a transform of the video blocks from a pixel domain to a transformed domain.

19. The apparatus of claim 12, wherein the apparatus encodes the video blocks,
wherein the scanning unit generates one-dimensional vectors of coefficients from two-dimensional blocks of coefficients based on scan orders defined for each of the prediction modes, and
wherein the entropy coding unit entropy encodes the one-dimensional vectors after the scanning unit scans the coefficient values.

20. The apparatus of claim 12, wherein the apparatus decodes the video blocks,
wherein the scanning unit generates two-dimensional blocks of coefficients from one-dimensional vectors of coefficients based on scan orders defined for each of the prediction modes, and
wherein the entropy coding unit entropy decodes the one-dimensional vectors prior to the scanning unit scanning the coefficient values.

21. The apparatus of claim 12, wherein the scanning unit examines the scan orders defined for each of the prediction modes at a pre-set update interval.

22. The apparatus of claim 12,
wherein the scanning unit repeats its store, count, scan and evaluate operations with respect to each of a plurality of coded units that form a video sequence, and
wherein the scan unit initializes the scan orders, the statistics and thresholds for each of the prediction modes before the scanning unit repeats its store, count, scan and evaluate operations for each of the plurality of coded units.

23. The apparatus of claim 12, wherein the apparatus comprises an integrated circuit.

24. The apparatus of claim 12, wherein the apparatus comprises a microprocessor.

25. A non-transitory computer-readable medium comprising instructions that upon execution in a video coding device cause the device to code coefficients of video blocks, wherein the instructions cause the device to:
store statistics associated with coefficient values of the video blocks for each of a plurality of prediction modes;
count the video blocks associated with each of the prediction modes;
scan the coefficient values of the video blocks based on scan orders defined for each of the prediction modes;
evaluate a given scan order associated with a given one of the prediction modes based on the statistics of the given one of the prediction modes when a count value indicative of a plurality of blocks counted for the given one of the prediction modes satisfies a threshold of the given one of the prediction modes;
determine a new scan order associated with the given one of the prediction modes based on the statistics of the given one of the prediction modes when the count value indicative of the plurality of blocks counted for the given one of the prediction modes satisfies the threshold of the given one of the prediction modes;
adjust the threshold of the given one of the prediction modes upon adjusting the given scan order of the given one of the prediction modes; and
entropy code the coefficient values.

26. The non-transitory computer-readable medium claim 25, wherein for each of the plurality of prediction modes the instructions cause the device to:
store statistics indicative of probabilities of the coefficient values being zero or non-zero.

27. The non-transitory computer-readable medium claim 25, wherein the instructions cause the device to:
determine a new scan order associated with the given one of the prediction modes based on the statistics of the given one of the prediction modes;
if the new scan order is the same as a previous scan order, increase the threshold of the given one of the prediction modes;
if the new scan order is different than the previous scan order, decrease the threshold of the given one of the prediction modes; and
re-set the count value indicative of a plurality of blocks counted for the given one of the prediction modes.

28. The non-transitory computer-readable medium claim 25, wherein the plurality of prediction modes comprise a plurality of intra prediction modes and a plurality of inter prediction modes.

29. The non-transitory computer-readable medium claim 28,
wherein the intra prediction modes comprise a plurality of 4 by 4 luma intra prediction modes, a plurality of 8 by 8 luma intra prediction modes, a plurality of 16 by 16 luma intra prediction modes, and a plurality of 8 by 8 chroma intra prediction modes; and
wherein the inter prediction modes comprise inter prediction modes corresponding to a 4 by 4 block size and an 8 by 8 block size.

30. The non-transitory computer-readable medium claim 25, wherein the entropy coding unit performs content adaptive variable length coding (CAVLC) or context adaptive binary arithmetic coding (CABAC).

31. The non-transitory computer-readable medium claim 25, wherein the instructions cause the device to:
generate the coefficient values via a transform of the video blocks from a pixel domain to a transformed domain.

32. The non-transitory computer-readable medium claim 25, wherein the instructions cause the device to encode the video blocks, wherein the instructions cause the device to:
generate one-dimensional vectors of coefficients from two-dimensional blocks of coefficients based on scan orders defined for each of the prediction modes, and
entropy encode the one-dimensional vectors after scanning the coefficient values.

33. The non-transitory computer-readable medium claim 25, wherein the instructions cause the device to decode the video blocks, wherein the instructions cause the device to:
generate two-dimensional blocks of coefficients from one-dimensional vectors of coefficients based on scan orders defined for each of the prediction modes, and
entropy decode the one-dimensional vectors prior to scanning the coefficient values.

34. The non-transitory computer-readable medium claim 25, wherein the instructions cause the device to:
examine the scan orders defined for each of the prediction modes at a pre-set update interval.

35. The non-transitory computer-readable medium claim 25,
wherein the instructions cause the device to repeat its store, count, scan and evaluate operations with respect to each of a plurality of coded units that form a video sequence, and
wherein the instructions cause the device to initialize the scan orders, the statistics and thresholds for each of the prediction modes before the instructions cause the device to repeat its store, count, scan and evaluate operations for each of the plurality of coded units.

36. A device that codes coefficients of video blocks, the device comprising:
means for storing statistics associated with coefficient values of the video blocks for each of a plurality of prediction modes;
means for counting the video blocks associated with each of the prediction modes;
means for scanning the coefficient values of the video blocks based on scan orders defined for each of the prediction modes;
means for evaluating a given scan order associated with a given one of the prediction modes based on the statistics of the given one of the prediction modes when a count value indicative of a plurality of blocks counted for the given one of the prediction modes satisfies a threshold of the given one of the prediction modes;
means for determining a new scan order associated with the given one of the prediction modes based on the statistics of the given one of the prediction modes when the count value indicative of the plurality of blocks counted for the given one of the prediction modes satisfies the threshold of the given one of the prediction modes;
means for adjusting the threshold of the given one of the prediction modes upon adjusting the given scan order of the given one of the prediction modes; and
means for entropy coding the coefficient values.

37. The device of claim 36, wherein means for storing the statistics comprises for each of the plurality of prediction modes:

means for storing statistics indicative of probabilities of the coefficient values being zero or non-zero.

38. The device of claim 36, further comprising:
means for determining a new scan order associated with the given one of the prediction modes based on the statistics of the given one of the prediction modes;
means for increasing the threshold of the given one of the prediction modes if the new scan order is the same as a previous scan order;
means for decreasing the threshold of the given one of the prediction modes if the new scan order is different than the previous scan order; and
means for re-setting the count value indicative of a plurality of blocks counted for the given one of the prediction modes.

39. The device of claim 36, wherein the plurality of prediction modes comprise a plurality of intra prediction modes and a plurality of inter prediction modes.

40. The device of claim 39,
wherein the intra prediction modes comprise a plurality of 4 by 4 luma intra prediction modes, a plurality of 8 by 8 luma intra prediction modes, a plurality of 16 by 16 luma intra prediction modes, and a plurality of 8 by 8 chroma intra prediction modes; and
wherein the inter prediction modes comprise inter prediction modes corresponding to a 4 by 4 block size and an 8 by 8 block size.

41. The device of claim 36, wherein means for entropy coding comprises means for content adaptive variable length coding (CAVLC) or means for context adaptive binary arithmetic coding (CABAC).

42. The device of claim 36, further comprising means for generating the coefficient values via a transform of the video blocks from a pixel domain to a transformed domain.

43. The device of claim 36, wherein the device encodes video blocks,
wherein means for scanning the coefficient values of the video blocks comprises means for generating one-dimensional vectors of coefficients from two-dimensional blocks of coefficients based on scan orders defined for each of the prediction modes, and
wherein means for entropy coding comprises means for entropy encoding the one-dimensional vectors after scanning the coefficient values.

44. The device of claim 36, wherein the device decodes video blocks,
wherein means for scanning the coefficient values of the video blocks comprises means for generating two-dimensional blocks of coefficients from one-dimensional vectors of coefficients based on scan orders defined for each of the prediction modes, and
wherein means for entropy coding comprises means for entropy decoding the one-dimensional vectors prior to scanning the coefficient values.

45. The device of claim 36, further comprising means for examining the scan orders defined for each of the prediction modes at a pre-set update interval.

46. The device of claim 36, wherein storing, counting, scanning and evaluating operations are repeated for each of a plurality of coded units that form a video sequence, the device further comprising means for initializing the scan orders, the statistics and thresholds for each of the prediction modes prior to the storing, counting, scanning and evaluating operations being repeated for each of the plurality of coded units.

47. A device comprising:
a scan unit that:
stores statistics associated with coefficient values of the video blocks for each of a plurality of prediction modes;
counts the video blocks associated with each of the prediction modes;
scans the coefficient values of the video blocks from two-dimensional blocks to one-dimensional vectors based on scan orders defined for each of the prediction modes;
evaluates a given scan order associated with a given one of the prediction modes based on the statistics of the given one of the prediction modes when a count value indicative of a plurality of blocks counted for the given one of the prediction modes satisfies a threshold of the given one of the prediction modes;
determines a new scan order associated with the given one of the prediction modes based on the statistics of the given one of the prediction modes when the count value indicative of the plurality of blocks counted for the given one of the prediction modes satisfies the threshold of the given one of the prediction modes; and
adjusts the threshold of the given one of the prediction modes upon adjusting the given scan order of the given one of the prediction modes;
an entropy coding unit that entropy encodes the coefficient values of the one-dimensional vectors; and
a wireless transmitter that sends a bitstream comprising the entropy encoded coefficient values.

48. The device of claim 47, wherein the device comprises a wireless communication handset.

49. A device comprising:
a wireless receiver that receives a bitstream comprising entropy coded coefficient values of video blocks in one-dimensional vectors;
an entropy coding unit that entropy decodes the coefficient values of the video blocks; and
a scan unit that:
stores statistics associated with coefficient values of the video blocks for each of a plurality of prediction modes;
counts the video blocks associated with each of the prediction modes;
scans the coefficient values of the video blocks from the one-dimensional vectors to two-dimensional blocks based on scan orders defined for each of the prediction modes;
evaluates a given scan order associated with a given one of the prediction modes based on the statistics of the given one of the prediction modes when a count value indicative of a plurality of blocks counted for the given one of the prediction modes satisfies a threshold of the given one of the prediction modes;
determines a new scan order associated with the given one of the prediction modes based on the statistics of the given one of the prediction modes when the count value indicative of the plurality of blocks counted for the given one of the prediction modes satisfies the threshold of the given one of the prediction modes; and
adjusts the threshold of the given one of the prediction modes upon adjusting the given scan order of the given one of the prediction modes.

50. The device of claim 49, wherein the device comprises a wireless communication handset.

* * * * *